Nov. 14, 1939. H. A. DELANO 2,180,102
REINFORCED ANTISKID TIRE CHAIN
Filed April 23, 1938
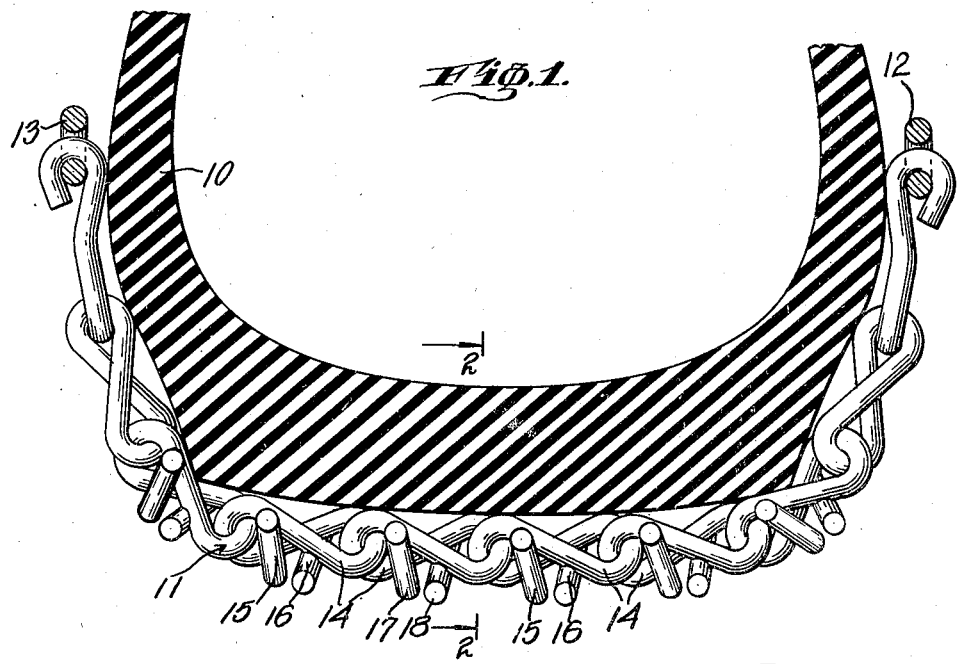
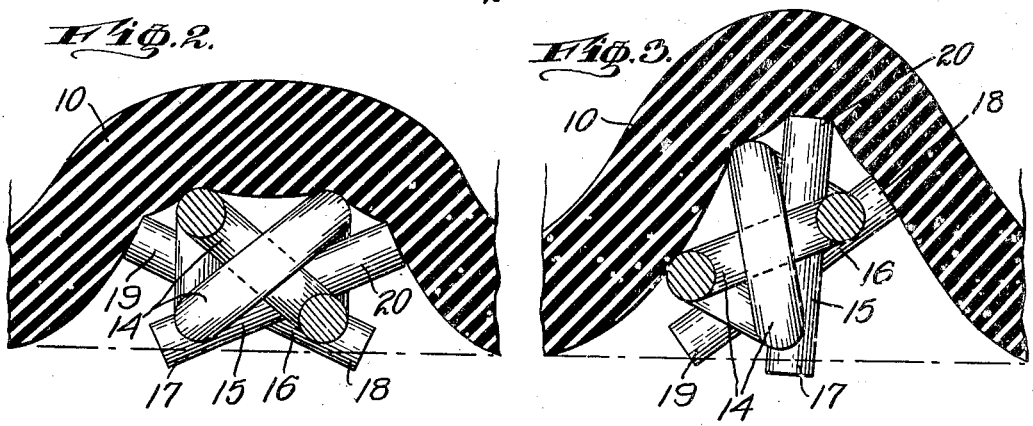
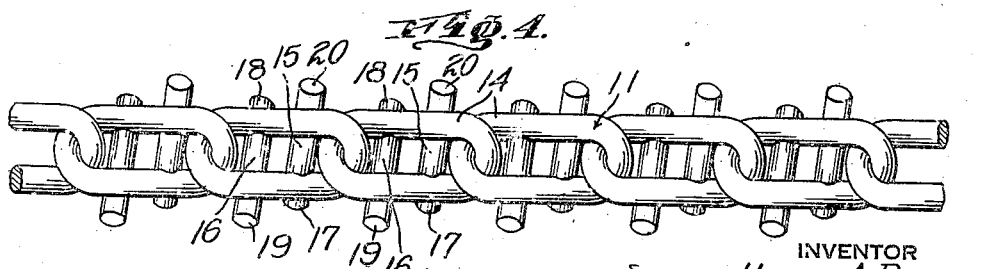
INVENTOR
HOWARD A. DELANO
BY
ATTORNEY Patented Nov. 14, 1939

2,180,102

UNITED STATES PATENT OFFICE 2,180,102

REINFORCED ANTISKID TIRE CHAIN

Howard A. Delano, Springettsbury Township, York County, Pa., assignor to American Chain & Cable Company, Inc., New York, N. Y., a corporation of New York Application April 23, 1938, Serial No. 203,732

13 Claims. (Cl. 152—243)

This invention relates to improvements in reinforced antiskid tire chains.

The main general object of this invention is the provision of an improved reinforced bar construction for the links of antiskid tire chains which affords improved resistance to sidewise skidding, increases the tractive efficiency of the chain during forward or backward traction and affords improved resistance to sliding movements when the brakes are applied.

One of the more specific objects of this invention is the provision of improved traction and antiskid reinforcements for such links which extend below the plane of the tread face of the link and outwardly beyond the sides of the link to effectively dig into the road to increase traction and to prevent skidding and sliding in any direction. It is also an object of this invention to employ reinforcements and to secure them to the side strands of the link in such a manner that they effectively reinforce the ground engaging portions of the link and prevent spreading of the link and so that both ends of the reinforcements under varying operating conditions function as traction and antiskid devices and as means for transferring more of the load from the road engaging portions of the tire to the chain.

Another object of the invention is to provide a link with primary and auxiliary traction and antiskid devices which operate successively and concurrently under increased traction and braking action, the construction being preferably such that as the normally effective primary device at the rear side of the link is rotated under increased tractive and braking efforts, the normally ineffective auxiliary device on the same side of the link is rotated into effective contact with the road, and the normally ineffective auxiliary and the normally effective primary devices on the other side of the link cooperate successively and concurrently as the link rolls to increase the proportionate weight of the load on the link, and that the greatest increase in load is placed on the link as the auxiliary or normally ineffective device is moved into effective road contact position.

Other objects of the invention consist in the provision of reinforcing bars located preferably in pairs on the link on opposite sides of the transverse central vertical plane of the link and spaced from but close to the road engaging lobes of the link to reduce the wear on the road engaging lobes, to provide diverging traction and antiskid lugs, and to prevent spreading of the side strands of the link, resulting in a longer life of the link and chain.

Other objects of the invention will appear from the following description taken in connection with the drawing, in which:

Fig. 1 is a view showing my improved reinforced antiskid link incorporated in a cross chain shown in position on a tire;

Fig. 2 is a section on the line 2—2 of Fig. 1 with the cross chain in normal position;

Fig. 3 is a similar view showing the cross chain rotated under traction forces; and Fig. 4 is a top plan view of a section of the cross chain shown in Fig. 1.

In describing this invention the portions of the link which engage the tire will be referred to as the upper portions or tire engaging lobes of the links and the portions which engage the road will be referred to as the lower portions or road engaging lobes of the link. In the drawing, I have disclosed a portion of a tire at 10 on which is mounted a cross chain 11 which may be one of a series of cross chains connected by side chains 12 and 13 in the conventional manner.

The cross chain 11 comprises a series of curb links 14 which are reinforced by bars 15 and 16 in accordance with my invention. Reinforcements are preferably applied only to those links which engage the road and are subject to road wear.

As disclosed in the drawing the bars 15 and 16 are preferably spaced and lie in planes which are substantially parallel to the transverse central vertical plane of the link and in intersecting planes having their line of intersection lying in the central vertical longitudinal plane of the link and below the longitudinal axis of the link. These bars may be straight bars as indicated and secured to the opposite side strands of the link by welding.

As disclosed in Fig. 2 each of the bars 15 and 16 is secured at one end to the "road" side of an inclined side strand of the link at a point adjacent to but spaced from the lowermost portion of the road engaging lobe and at its other end to the "road" side of the opposite side strand of the link adjacent to but spaced from the lowermost portion of the tire engaging lobe of the same end of the link. Each bar 15 and 16 preferably extends beyond both sides of the link. The ends 17 and 18 of the bars projecting beyond the sides of the link adjacent the road engaging lobes constitute downwardly and outwardly flaring antiskid lugs or traction caulks or reinforcements which diverge with respect to each other and extend beyond the plane of the lowermost portions of the road engaging lobes of the links and also beyond the sides of the link. The other ends 19 and 20 of the links extend laterally of the sides of the link adjacent their tire engaging lobes and as shown in Fig. 2 increase the effective width of the link so that a greater area of the surface of the tire is depressed by the improved reinforced link than by a "plain" curb link of the same dimensions and a greater proportion of the load on the tire is transferred to the link and to the ends 17 and 18 which are in contact with the road.

As the tire is driven clockwise, Fig. 3, during forward traction, the link may be rotated counter-clockwise toward or into the position shown in Fig. 3 in which position the end 17 of the bar 15 is still effective as a traction caulk or antiskid lug and the end 19 of the bar 16 will have been rotated into effective contact with the road. Should the link be rotated far enough to decrease the effectiveness of the end 17, the end 19 alone would provide effective traction. The ends 18 and 20 in the position shown in Fig. 3 increase the width and depth of the depression in the tire over that which would be produced by the link in the absence of such reinforcements. It will be seen that under these conditions a large amount of the load on the tire is transferred onto the chain links causing the caulks 17 and 19 to be forced by increased pressure into the road. As is well understood, the link is rotated clockwise during braking but the operation is essentially the same.

I have disclosed the bars 15 and 16 as being made of straight round stock but it is to be understood that bars of curved or V-shape or any other shape lengthwise, and of other cross sectional shapes may be used. I prefer however to use straight bars which have been found to be very effective and cheap to manufacture and to apply to the link. I prefer to apply these bars in spaced relation in parallel planes on opposite sides of the transverse central vertical plane of the link and upon the inclined portions of the side strands of the link close to the ends thereof so that they will increase the effective width of the link at the ground engaging lobe portions thereof, brace the links near their ground engaging lobes or end loops where they are connected with adjacent links and prevent adjacent links from telescoping into each other which prevents undue kinking, cocking, and twisting of the cross chain.

As clearly indicated in Fig. 2, the ends 17 and 18 are spaced when the link is new and will remain spaced when worn down into the plane of the lowermost portions of the road engaging lobes, as they are parts of spaced bars, and after these ends and the road engaging lobes have been worn to present connected faces, these ends will still project laterally of the sides of the link and effectively prevent skidding until the ground engaging lobes of the link have been worn to such an extent as to weaken the link to prevent its further use. As I disclosed I prefer to locate the antiskidding projections slightly spaced from but adjacent to the ground engaging lobes of the link.

As the ends 17 and 18 project beyond the ground engaging lobes of the link, they effectively prevent lateral skidding of the tire as well as skidding and sliding in the direction of the travel of the vehicle. By making the ends 17 and 18 parts of bars which overlap and are secured to opposite side strands of the link, each end 17 and 18 is effectively anchored to the link.

As appears from Figs. 2 and 3 a large amount of the wear in ordinary travel will be taken by the ends 17 and 18 even after these parts and the ground engaging lobes of the links have been worn down, and the ends 19 and 20 which are not subject to much wear in ordinary travel will retain their effectiveness to act as traction devices and to prevent skidding under increased tractive and braking efforts.

The bars may be arranged in planes which are parallel to the transverse central vertical plane of the link or extend at a slight angle thereto as shown and, if desired, at an angle to each other. By locating the bars as shown I obtain a satisfactory angle of divergence between the ends 17 and 18, effective reinforcing of the ground engaging lobes and effective bracing of the ends of the link.

I have deemed it sufficient for purposes of disclosure to illustrate and describe a single embodiment of my invention and it is obvious that various changes will be suggested to those familiar with this art after understanding the principles of my invention. It is to be understood that I reserve the right to make and use all such modifications as fall within the principles of my invention and the scope of the appended claims.

I claim:

1. In an antiskid device, a tread link comprising a pair of side strands connected at opposite ends thereof to form a closed loop, and spaced transversely extending bars bridging the link and secured at points on each side of the link, the said bars making an angle with the plane of the road and with each other.

2. In an antiskid device, a tread link comprising side strands connected at opposite ends thereof to form a closed loop, and a pair of transversely extending bars bridging the link and secured to said side strands and arranged in parallel vertical planes at opposite sides of the central tranverse vertical plane of said link and in planes intersecting along a line extending longitudinally of the link.

3. In an antiskid device, a tread link comprising side strands connected at opposite ends thereof to form a closed loop, and a pair of transversely extending bars arranged on opposite sides of the central transverse vertical plane of said link and each secured to both of said side strands, said bars lying in planes intersecting along a line extending in the direction of the longitudinal axis of the link, each of which planes extends at the same angle with respect to the central horizontal plane of the link, and each of said bars having at least one of its ends projecting beyond a side strand. said projecting portions constituting downwardly diverging antiskid lugs.

4. In an antiskid device, a link comprising side strands connected at opposite ends thereof to form a closed loop, and a pair of transversely extending bars arranged on opposite sides of the central transverse vertical plane of said link and each secured to both of said side strands, said bars lying in planes intersecting on a line extending longitudinally of the link, said planes being each arranged at the same angle with respect to the central horizontal plane through the link, each of said bars projecting beyond both of said strands providing downwardly diverging primary antiskid lugs and upwardly diverging secondary antiskid lugs.

5. In an antiskid chain, a link comprising spaced oppositely inclined side strands, and a pair of spaced transversely extending bars located on opposite sides of the central transverse vertical plane of the link, and each connected to the road faces of both of said side strands.

6. In an antiskid chain, a link comprising spaced oppositely inclined side strands, and a pair of transversely extending spaced bars arranged at equal distances from the central transverse vertical plane of the link and each connected to the road faces of both of said side strands.

7. In an antiskid chain, a link comprising spaced oppositely inclined side strands and ground engaging lobes, and a pair of transversely extending spaced bars arranged at equal distances from the central transverse vertical plane of the link and each connected to both of said side strands, one end of each of said bars projecting downwardly below the plane of the ground engaging lobes of the link.

8. In an antiskid chain, a link comprising spaced oppositely inclined side strands and ground engaging lobes, and a pair of transversely extending spaced bars arranged at equal distances from the central transverse vertical plane of the link and each connected to both of said side strands, one end of each of said bars extending downwardly below the plane of the ground engaging lobes of the link and laterally beyond the adjacent side strand of the link.

9. In an antiskid chain, a link comprising spaced oppositely inclined side strands and ground engaging lobes, and a pair of transversely extending spaced bars arranged at equal distances from the central transverse vertical plane of the link and each connected to both of said side strands, the lower ends of said bars extending downwardly below the plane of the ground engaging lobes of the link and laterally beyond the sides of the link, and the upper ends of said bars extending laterally outwardly beyond the sides of the link.

10. In an antiskid chain, a link of the conventional curb type including tire engaging lobes and ground engaging lobes and oppositely inclined side strands, and a pair of bars located on opposite sides of the central transverse vertical plane of the link and each secured to the road faces of said side strands at points adjacent to the tire and ground engaging lobes.

11. In an antiskid chain, the combination of a curb link including oppositely inclined side strands and angularly related loop ends, and a pair of bars bridging and secured to the road faces of said side strands and located in planes angularly related with respect to each other and intersecting along a line below the central transverse horizontal plane through the link.

12. In an antiskid device, the combination of a curb link comprising oppositely inclined side strands and angularly related end loops defining ground engaging and tire engaging lobes, and a pair of transversely extending bars bridging and connected to both of said side strands and having one of their ends extending below the plane of the ground engaging lobes and laterally beyond the sides of the link and having their other ends extending laterally beyond the sides of the link.

13. In an antiskid tire chain, a curb link comprising oppositely inclined side strands and ground engaging and tire engaging lobes, reinforcements secured to the road face of said side strands at points adjacent said ground engaging lobes and extending in diverging relation downwardly beyond the plane of the ground engaging lobes and laterally beyond the sides of the link, and reinforcements connected to said side strands adjacent the tire engaging lobes on the road face thereof and extending in upwardly diverging relation and extending laterally beyond the sides of the link.

HOWARD A. DELANO.